US012636939B2

(12) United States Patent
Sjoholm et al.

(10) Patent No.: US 12,636,939 B2
(45) Date of Patent: May 26, 2026

(54) SIMULTANEOUS VAPOR AND LIQUID INJECTION

(71) Applicant: THERMO KING LLC, Minneapolis, MN (US)

(72) Inventors: Lars I. Sjoholm, Burnsville, MN (US); Gurudath Nayak Hebri, Karnataka (IN); Alexander Schmig, La Crosse, WI (US)

(73) Assignee: THERMO KING LLC, Minneapolis, MN (US)

( * ) Notice: Subject to any disclaimer, the term of this patent is extended or adjusted under 35 U.S.C. 154(b) by 430 days.

(21) Appl. No.: 18/175,243

(22) Filed: Feb. 27, 2023

(65) Prior Publication Data

US 2023/0271481 A1      Aug. 31, 2023

(30) Foreign Application Priority Data

Feb. 25, 2022    (IN) .............................. 202241010183

(51) Int. Cl.
B60H 1/32           (2006.01)

(52) U.S. Cl.
CPC ......... B60H 1/3211 (2013.01); B60H 1/3228 (2019.05); *B60H 2001/3257* (2013.01); *F25B 2400/13* (2013.01)

(58) Field of Classification Search
CPC ................ B60H 1/3211; B60H 1/3228; B60H 2001/3257; F25B 2400/13; F25B 40/02; F25B 39/04
See application file for complete search history.

(56) References Cited

U.S. PATENT DOCUMENTS 4,062,199 A  * 12/1977  Kasahara .............. F04C 29/042
                                                                    62/505
7,204,099 B2     4/2007  Lifson et al.
                         (Continued)

FOREIGN PATENT DOCUMENTS

CN        210070320       2/2020
DE         2628088        1/1977
WO       2011/112411      9/2011

OTHER PUBLICATIONS

Extended European Search Report, issued in the corresponding European patent application No. 23158750.2, dated Jul. 26, 2023, 8 pages.

*Primary Examiner* — Elizabeth J Martin
(74) *Attorney, Agent, or Firm* — HSML P.C.

(57)        ABSTRACT

Systems and methods for simultaneous vapor and liquid injection for a transport climate control system are provided. The system includes a compressor, a condenser having a condensing unit and a sub-cooling unit, a receiver, an economizer having a vapor outlet and a liquid outlet, a controller, and a flow control device. The receiver is disposed downstream of the condensing unit and upstream of the sub-cooling unit. The economizer is disposed downstream of the sub-cooling unit. The compressor includes a suction port, a vapor injection port connected to the vapor outlet of the economizer, and a liquid injection port separated from the vapor injection port. The controller is configured to control the flow control device to adjust an amount of liquid refrigerant into the liquid injection port to maintain a discharge temperature of the compressor at or below a threshold.

9 Claims, 9 Drawing Sheets

(56)  References Cited

U.S. PATENT DOCUMENTS

| | | | |
|---|---|---|---|
| 8,181,478 | B2 | 5/2012 | Ignatiev |
| 8,303,278 | B2 | 11/2012 | Roof et al. |
| 8,375,741 | B2 | 2/2013 | Taras et al. |
| 8,424,326 | B2 | 4/2013 | Mitra et al. |
| 8,769,982 | B2 | 7/2014 | Ignatiev et al. |
| 2008/0078192 | A1 | 4/2008 | Ignatiev et al. |
| 2008/0236179 | A1* | 10/2008 | Ignatiev .................... F25B 1/10 |
| | | | 62/190 |
| 2010/0068084 | A1 | 3/2010 | Lifson |
| 2012/0318006 | A1* | 12/2012 | Liu ......................... F25D 21/08 |
| | | | 62/190 |
| 2021/0394587 | A1* | 12/2021 | Senf, Jr. ............. B60H 1/00271 |

* cited by examiner

SIMULTANEOUS VAPOR AND LIQUID INJECTION

FIELD

This disclosure relates generally to simultaneous vapor and liquid injection control for a transport climate control system (TCCS). More specifically, the disclosure relates to systems and methods for simultaneous vapor and liquid injection control for a TCCS, for example, to maintain a desired discharge temperature.

BACKGROUND

A TCCS can include, for example, a transport refrigeration system (TRS) and/or a heating, ventilation and air conditioning (HVAC) system including heat pump(s) (e.g., low temperature heat pump(s) or the like). A TRS having a transport refrigeration unit (TRU) is generally used to control an environmental condition (e.g., temperature, humidity, air quality, and the like) within a cargo space of a transport unit (e.g., a truck, a container (such as a container on a flat car, an intermodal container, etc.), a box car, a semi-tractor, a bus, or other similar transport unit). The TRS can maintain environmental condition(s) of the cargo space to maintain cargo (e.g., produce, frozen foods, pharmaceuticals, etc.).

SUMMARY

This disclosure relates generally to simultaneous vapor and liquid injection control for a TCCS. More specifically, the disclosure relates to systems and methods for simultaneous vapor and liquid injection control for a TCCS, for example, to maintain a desired discharge temperature.

Industrial regulations may require the TCCS to meet certain standards including global warming standards. Refrigerants with lower global warming potential (GWP) (e.g., R454A, R454C, or the like, with a GWP lower than e.g., 150 or the like) are typically desired. However, such refrigerants may have a high heat of compression (e.g., when a value of a heat capacity ratio, which is represented by heat capacity at constant pressure/heat capacity at constant volume, can be at, about, or more than 1.1), leading to a high discharge temperature (e.g., about or less than 150 Celsius degrees).

A2L refrigerants (e.g., R454A, R454C, or the like) may have higher heat of compression which gives higher discharge temperature compared to refrigerants such as R404A, R452A, or the like. As such, for A2L refrigerants, a much larger operating area may need liquid injection besides vapor injection, and separating the vapor and liquid injection ports can lower energy consumption relative to the refrigeration capacity. It will be appreciated that A2L refrigerants are a class of refrigerants that have a specified range of toxicity and flammability according to the American Society of Heating, Refrigeration, and Air Conditioning Engineers (ASHRAE) Standard.

Embodiments disclosed herein can be used for hermetic or semi-hermetic scroll compressors or the like, or any suitable compressors (e.g., positive displacement compressors) with built-in volume ratio such as scroll and screw compressors and other rotary compressors, including open, hermetic, and semi-hermetic compressors. Embodiments disclosed herein can be used with refrigerants including one or more of R452A, R404A, R454A, R454C, R449A, R449C, R448A, R448B, R134a, R513A, R1234yf, R515B, or the like. Embodiments disclosed herein can also be used with lubricants such as polyvinyl ether (PVE), polyolester (POE), or the like.

Embodiments disclosed herein can help to maintain a discharge temperature below a desired threshold level. Embodiments disclosed herein can also prevent reduced vapor injection mass flow and thus prevent reduction of sub-cooling capability of the refrigerant flowing through the evaporator which can result in reduced refrigeration capacity of the evaporator. Embodiments disclosed herein can further help to achieve as wide a compressor operating envelope as possible within the mechanical design limits or applicable standards.

In an embodiment, a transport climate control system with simultaneous vapor and liquid injection is provided. The system includes a compressor, a condenser having a condensing unit and a sub-cooling unit, a receiver, an economizer having a vapor outlet and a liquid outlet, a controller, and a flow control device. The receiver is disposed downstream of the condensing unit and upstream of the sub-cooling unit. The economizer is disposed downstream of the sub-cooling unit. The compressor includes a suction port, a vapor injection port connected to the vapor outlet of the economizer, and a liquid injection port separated from the vapor injection port. The controller is configured to control the flow control device to adjust an amount of liquid refrigerant into the liquid injection port to maintain a discharge temperature of the compressor at or below a threshold.

In an embodiment, a method for simultaneous vapor and liquid injection for a transport climate control system is provided. The system including a compressor, a condenser having a condensing unit and a sub-cooling unit, a receiver, an economizer having a vapor outlet and a liquid outlet, a controller, and a flow control device. The receiver is disposed downstream of the condensing unit and upstream of the sub-cooling unit. The economizer is disposed downstream of the sub-cooling unit. The compressor includes a suction port, a vapor injection port connected to the vapor outlet of the economizer, and a liquid injection port separated from the vapor injection port. The method includes controlling the flow control device to adjust an amount of liquid refrigerant into the liquid injection port, and maintaining a discharge temperature of the compressor at or below a threshold.

Other features and aspects will become apparent by consideration of the following detailed description and accompanying drawings.

BRIEF DESCRIPTION OF THE DRAWINGS

References are made to the accompanying drawings that form a part of this disclosure and which illustrate the embodiments in which systems and methods described in this specification can be practiced.

FIGS. 2-6 illustrate schematic views of refrigeration circuits, according to some embodiments.

Like reference numbers represent like parts throughout.

DETAILED DESCRIPTION

This disclosure relates generally to simultaneous vapor and liquid injection control for a TCCS. More specifically, the disclosure relates to systems and methods for simultaneous vapor and liquid injection control for a TCCS, for example, to maintain a desired discharge temperature.

As defined herein, the phrase "heat of compression" may refer to a basic inefficiency of compressed air or gas with regard to energy used to compress it compared to work energy actually delivered. "Heat of compression" may also refer to temperature rise even at isentropic compression. In an embodiment, the heat of compression can be determined or represented by Cp/Cv for a given pressure. The Cp/Cv ratio can be referred to as a heat capacity ratio. It will be appreciated that in thermodynamics, the heat capacity ratio can be the adiabatic index. For example, the heat capacity ratio=Cp/Cv=heat capacity at constant pressure/heat capacity at constant volume. Embodiments disclosed herein can provide simultaneous vapor and liquid injection control to maintain the discharge temperature, the Cp/Cv ratio, and the heat capacity ratio.

As defined herein, the phrase "receiver" or "receiver tank" may refer to a storage vessel designed to hold excess fluid at some conditions (e.g., refrigerant or the like) that is not in circulation. In some embodiments, refrigeration systems exposed to varying loads (heat or cool or the like), or systems utilizing a condenser flooding valve to maintain a minimum head pressure during low ambient temperatures, may need a receiver to store excess refrigerant.

As defined herein, the phrase "upstream" may refer to an opposite direction from that in which refrigerant flows. The phrase "downstream" may refer to the direction in which refrigerant flows.

As defined herein, the phrase "superheat" may refer to a measurement of a temperature when a vapor (e.g., refrigerant) is above its dew point.

As defined herein, the phrase "overall built-in volume ratio" may refer to a ratio of volume inside a compressor when the suction opening of the compressor closes, divided by the volume inside the compressor just as the discharge opening opens.

Figure 1A:
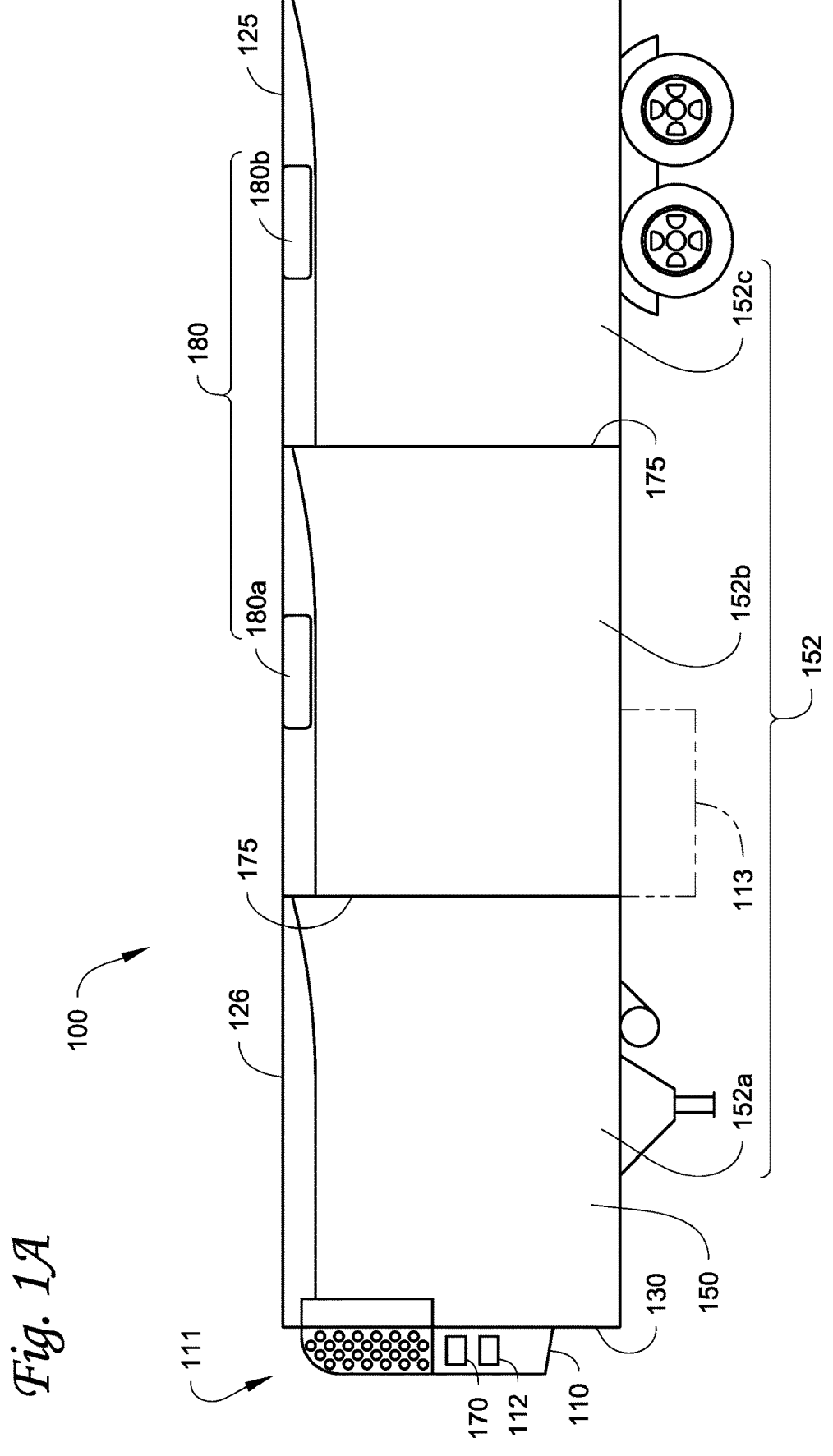
FIG. 1A illustrates a schematic cross sectional side view of a refrigerated transport unit with a multi-temp transport refrigeration system (MTRS), according to an embodiment.

FIG. 1A illustrates one embodiment of a MTRS 100 for a transport unit (TU) 125 that can be towed, for example, by a tractor (not shown). The MTRS 100 includes a TRU 110 that provides environmental control (e.g. temperature, humidity, air quality, etc.) within an internal space 150 of the TU 125. The MTRS 100 also includes a MTRS controller 170 and one or more sensors that are configured to measure one or more parameters (e.g., ambient temperature, compressor suction pressure, compressor discharge pressure, supply air temperature, return air temperature, humidity, etc.) of the MTRS 100 and communicate parameter data to the MTRS controller 170. The MTRS 100 is powered by a power module 112. The TRU 110 is disposed on a front wall 130 of the TU 125. In other embodiments, it will be appreciated that the TRU 110 can be disposed, for example, on a rooftop 126 or another wall of the TU 125.

In some embodiments, the MTRS 100 can include an undermount unit 113. In some embodiments, the undermount unit 113 can be a TRU that can also provide environmental control (e.g. temperature, humidity, air quality, etc.) within the internal space 150 of the TU 125. The undermount unit 113 can work in combination with the TRU 110 to provide redundancy or can replace the TRU 110. Also, in some embodiments, the undermount unit 113 can be a power module that includes, for example, a generator that can help power the TRU 110.

It will be appreciated that in the embodiments disclosed herein, the transport refrigeration unit and/or the power unit can be front mounted, under-mounted, a combination thereof, or the like. The system can include an alternator, a generator, or both. The compressor can be an AC compressor or a DC compressor. The compressor can also be a hermetic compressor or a semi-hermetic compressor.

The programmable MTRS Controller 170 may comprise a single integrated control unit or may comprise a distributed network of TRS control elements. The number of distributed control elements in a given network can depend upon the particular application of the principles described herein. The MTRS controller 170 is configured to control operation of the MTRS 100.

As shown in FIG. 1A, the power module 112 is disposed in the TRU 110. In other embodiments, the power module 112 can be separate from the TRU 110. Also, in some embodiments, the power module 112 can include two or more different power sources disposed within or outside of the TRU 110. In some embodiments, the power module 112 can include one or more of a prime mover, a battery, an alternator, a generator, a solar panel, a fuel cell, etc. Also, the prime mover can be a combustion engine or a microturbine engine and can operate as a two speed prime mover, a variable speed prime mover, etc. The power module 112 can provide power to, for example, the MTRS Controller 170, a compressor (not shown), a plurality of DC (Direct Current) components (not shown), a power management unit (not shown), etc. The DC components can be accessories or components of the MTRS 100 that require DC power to operate. Examples of the DC components can include, for example, DC fan motor(s) for a condenser fan or an evaporator blower (e.g., an Electrically Commutated Motor (ECM), a Brushless DC Motor (BLDC), etc.), a fuel pump, a drain tube heater, solenoid valves (e.g., controller pulsed control valves), etc.

The power module 112 can include a DC power source (not shown) for providing DC electrical power to the plurality of DC components (not shown), the power management unit (not shown), etc. The DC power source can receive mechanical and/or electrical power from, for example, a utility power source (e.g., Utility power, etc.), a prime mover (e.g., a combustion engine such as a diesel engine, etc.) coupled with a generator machine (e.g., a belt-driven alternator, a direct drive generator, etc.), etc. For example, in some embodiments, mechanical energy generated by a diesel engine is converted into electrical energy via a generator machine. The electrical energy generated via the belt driven alternator is then converted into DC electrical power via, for example, a bi-directional voltage converter. The bi-directional voltage converter can be a bi-directional multi-battery voltage converter.

The internal space 150 can be divided into a plurality of zones 152. The term "zone" means a part of an area of the internal space 150 separated by walls 175. It will be appreciated that the invention disclosed herein can also be used in a single zone TRS.

The MTRS 100 for the TU 125 includes the TRU 110 and a plurality of remote evaporator units 180. The MTRS 101 includes a host unit 111 provided within the TRU 110 for providing climate control within the first zone 152a and a plurality of remote units 180 disposed in the TU 125. Namely a first remote unit 180a is disposed in the second zone 152b and a second remote unit 180b is disposed in the third zone 152c. The host unit 111 and the remote units 180 are collectively herein referred to as heat exchange units.

In some embodiments, each remote unit 180a, 180b can be fluidly connected to the host unit 111. The host unit 111 and each remote unit 180a, 180b may include one or more heat exchangers (e.g., evaporator(s)), one or more fan(s) for providing climate control within the particular zone the heat exchanger unit is located, one or more flow regulating devices (e.g., solenoid valve(s), etc.) for controlling the amount of refrigerant flow into the heat exchanger unit, and one or more throttling devices (e.g., electronic throttling valve(s), etc.) for controlling the amount of refrigerant flow available to a suction end of the compressor of the MTRS 100. The heat exchange units (e.g., the host unit 111 and each of the remote units 180) can operate in a plurality of operational modes (e.g., a NULL mode, a running NULL mode, a COOL mode, a HEAT mode, a DEFROST mode, a low fan speed mode, a high fan speed mode, a high engine speed mode, a low engine speed mode, etc.).

Figure 1B:
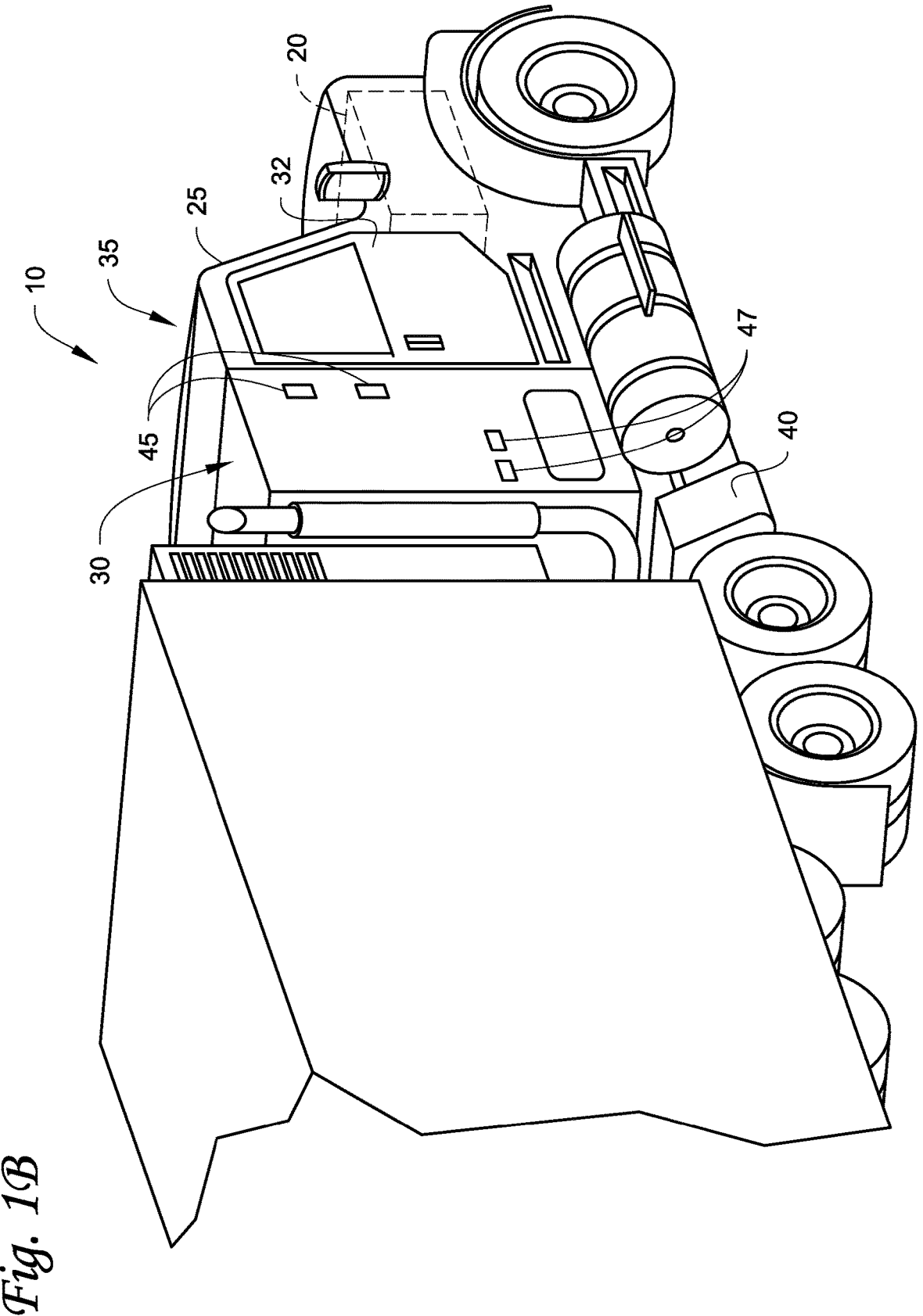
FIG. 1B illustrates a perspective view of a vehicle with an APU, according to an embodiment.

In some embodiments, an HVAC system can be powered by an Auxiliary Power Unit (APU, see FIG. 1B). The APU can be operated when a main prime mover of the TU 125 is turned off such as, for example, when a driver parks the TU 125 for an extended period of time to rest. The APU can provide, for example, power to operate a secondary HVAC system to provide conditioned air to a cabin of the TU 125. The APU can also provide power to operate cabin accessories within the cabin such as a television, a microwave, a coffee maker, a refrigerator, etc. The APU can be a mechanically driven APU (e.g., prime mover driven) or an electrically driven APU (e.g., battery driven).

The tractor includes a vehicle electrical system for supplying electrical power to the electrical loads of the tractor, the MTRS 100, and/or the TU 125. In some embodiments, the MTRS 100 and/or the HVAC system can include a refrigeration circuit (e.g., the refrigeration circuit of FIGS. 2-6).

FIG. 1B illustrates a vehicle 10 according to one embodiment. The vehicle 10 is a semi-tractor that is used to transport cargo stored in a cargo compartment (e.g., a container, a trailer, etc.) to one or more destinations. Hereinafter, the term "vehicle" shall be used to represent all such tractors and trucks, and shall not be construed to limit the invention's application solely to a tractor in a tractor-trailer combination. In some embodiments, the vehicle 10 can be, for example, a straight truck, van, etc.

The vehicle 10 includes a primary power source 20, a cabin 25 defining a sleeping portion 30 and a driving portion 35, an APU 40, and a plurality of vehicle accessory components 45 (e.g., electronic communication devices, cabin lights, a primary and/or secondary HVAC system, primary and/or secondary HVAC fan(s), sunshade(s) for a window/windshield of the vehicle 10, cabin accessories, etc.). The cabin 25 can be accessible via a driver side door (not shown) and a passenger side door 32. The cabin 25 can include a primary HVAC system (not shown) that can be configured to provide conditioned air within driving portion 35 and potentially the entire cabin 25, and a secondary HVAC system (not shown) for providing conditioned air within the sleeping portion 30 of the cabin 25. The cabin 25 can also include a plurality of cabin accessories (not shown). Examples of cabin accessories can include, for example, a refrigerator, a television, a video game console, a microwave, device charging station(s), a continuous positive airway pressure (CPAP) machine, a coffee maker, a secondary HVAC system for providing conditioned air to the sleeping portion 30. In some embodiments, the primary HVAC system and/or the secondary HVAC system can include a refrigeration circuit (e.g., the refrigeration circuit of FIGS. 2-6).

The primary power source 20 can provide sufficient power to operate (e.g., drive) the vehicle 10 and any of the plurality of vehicle accessory components 45 and cabin accessory components 47. The primary power source 20 can also provide power to the primary HVAC system and the secondary HVAC system. In some embodiments, the primary power source can be a prime mover such as, for example, a combustion engine (e.g., a diesel engine, etc.). It will be appreciated that the source(s) of the power for the compressor may not be significant, as long as there is sufficient power for the compressor.

The APU 40 is a secondary power unit for the vehicle 10 when the primary power source is unavailable. When, for example, the primary power source 20 is unavailable, the APU 40 can be configured to provide power to one or more of the vehicle accessory components, the cabin accessories, the primary HVAC system and the secondary HVAC system. In some embodiments, the APU 40 can be an electric powered APU. In other embodiments, the APU 40 can be a prime mover powered APU. The APU 40 can be attached to the vehicle 10 using any attachment method. In some embodiments, the APU 40 can be turned on (i.e., activated) or off (i.e., deactivated) by an occupant (e.g., driver or passenger) of the vehicle 10. The APU 40 generally does not provide sufficient power for operating (e.g., driving) the vehicle 10. The APU 40 can be controlled by an APU controller 41.

Figure 1C:
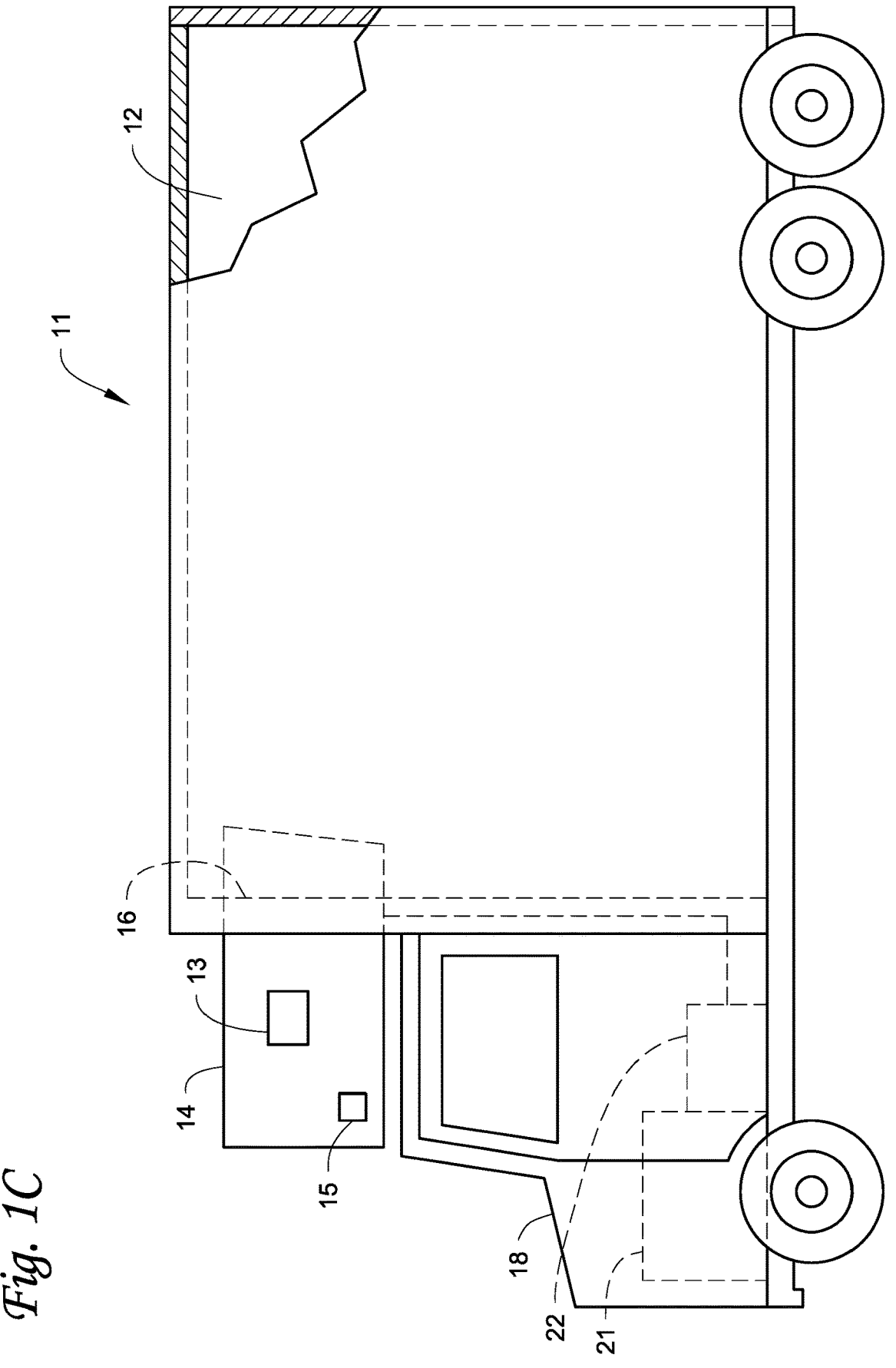
FIG. 1C illustrates a side view of a truck with a front wall mounted vehicle powered transport refrigeration unit, according to an embodiment.

FIG. 1C depicts a temperature-controlled straight truck 11 that includes a conditioned load space 12 for carrying cargo. A transport refrigeration unit (TRU) 14 is mounted to a front wall 16 of the load space 12. The TRU 14 is controlled via a controller 15 to provide temperature control within the load space 12. The truck 11 further includes a vehicle power bay 18, which houses a truck prime mover 21, such as a combustion engine (e.g., diesel engine, etc.), that provides power to move the truck 11. In some embodiments, the truck prime mover 21 can work in combination with an optional machine 22 (e.g., an alternator). The TRU 14 includes a prime mover 13. In an embodiment, the prime mover 13 can be a combustion engine (e.g., diesel engine, etc.) to provide power to the TRU 14. In one embodiment, the TRU 14 includes a vehicle electrical system. Also, in some embodiments, the TRU 14 can be powered by the prime mover 13 in combination with a battery power source or by the optional machine 22. In some embodiments, the TRU 14 can also be powered by the truck prime mover 21 in combination with a battery power source or the optional machine 22. In some embodiments, the TRU 14 can include a refrigeration circuit (e.g., the refrigeration circuit of FIGS. 2-6).

While FIG. 1C illustrates a temperature-controlled straight truck 11, it will be appreciated that the embodiments described herein can also apply to any other type of transport unit including, but not limited to, a container (such as a container on a flat car, an intermodal container, etc.), a box car, or other similar transport unit.

FIGS. 2-6 illustrate schematic views of refrigeration circuits (200, 201, 202, 203, and 204), according to some embodiments. Each refrigeration circuit 200-204 can be a part of a TCCS such as the MTRS 100, the TRU 110 and 14 and/or the HVAC system of FIGS. 1A-1C. The TCCS can include sensors (e.g., temperature, pressure, humidity, motion, voltage, current, battery status, battery charging level, or the like) or the TCCS can communicate with sensors associated or embedded with a cargo. The controller of the TCCS (e.g., the MTRS controller 170, the APU controller 41, the controller 15) can obtain data sensed by the sensors and control the settings of the components (e.g., refrigerant or lubricant/oil flow control device, or the like) of the TCCS.

Controls described herein can be performed by a controller (e.g., the controller of the transport refrigeration unit/ system of FIGS. 1A and 1C, the controller of the APU of FIG. 1B, or the like). The controller (e.g., the MTRS controller 170, the APU controller 41, the controller 15) can connect to and control the components of FIGS. 2-6 via e.g., wireless or wire connections.

Figures 2, 3:
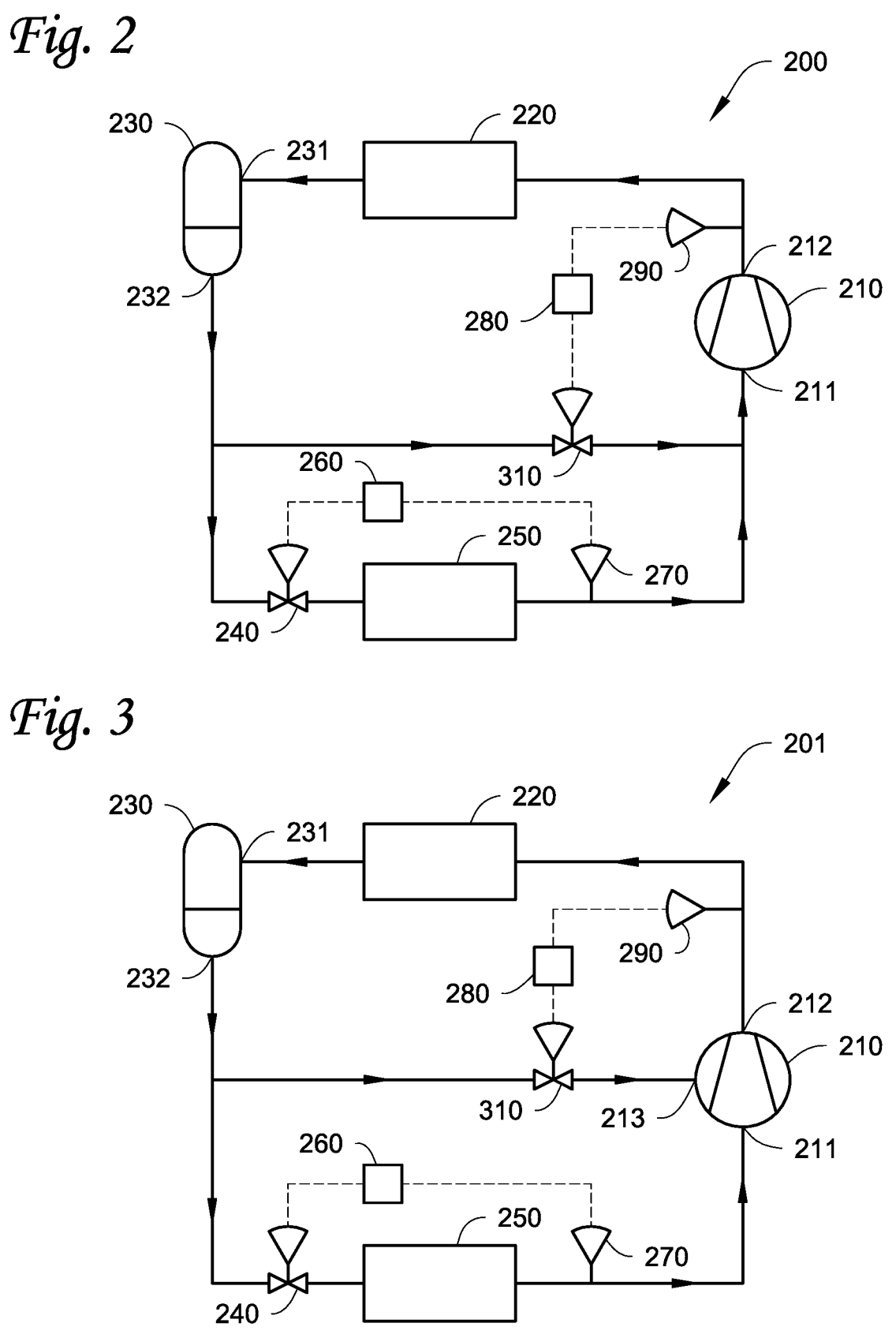

As shown in FIGS. 2 and 3, the refrigeration circuits 200 and 201 include a compressor 210, a condenser 220 disposed downstream of the compressor 210, a receiver 230 disposed downstream of the condenser 220, an expansion device 240 disposed downstream of the receiver 230, an evaporator 250 disposed downstream of the expansion device 240, sensors (270, 290), controller(s) (260, 280), and a flow control device 310. The compressor is disposed downstream of the evaporator 250. The receiver 230 includes an inlet 231 and an outlet 232. The compressor 210 includes a suction port 211 and a discharge port 212.

It will be appreciated that controller(s) (260, 280) can be a single controller (e.g., the controller of the transport refrigeration unit/system of FIGS. 1A and 1C, the controller of the APU of FIG. 1B, or the like). Each of the sensors (270, 290) can be a sensor sensing or measuring one of more of temperature, pressure, humidity, motion, voltage, current, battery status, battery charging level, or the like. The sensor 270 is disposed downstream of the evaporator 250 and upstream of the compressor 210. The sensor 290 is disposed downstream of the compressor 210 and upstream of the condenser 220.

The expansion device 240 can be e.g., an expansion valve, orifice, expander, or the like. The flow control device 310 can be e.g., a valve, an orifice, a tap, or the like that can be controlled by a controller to open, close, or partially open to allow, block, increase, or decrease a fluid (e.g., refrigerant or the like) flow. The controller (e.g., 260 or the like) can be configured to control the opening of the expansion device 240 based on the parameters (e.g., temperature, pressure, or the like) sensed or measured by the sensor 270. The controller (e.g., 280 or the like) can be configured to adjust the opening of the flow control device 310 based on the parameters (e.g., discharge temperature, discharge superheat, or the like) sensed or measured by the sensor 290 to maintain the parameters at or below a desired or predetermined threshold.

In FIG. 2, the outlet 232 of the receiver 230 is fluidly connected to the suction port 211 of the compressor 210 via a pipe or the like. The flow control device 310 is disposed downstream of the receiver 230 and upstream of the compressor 210. Through control of the flow control device 310, the refrigerant (e.g., liquid refrigerant) directly from the receiver 230 can mix with the refrigerant from the evaporator 250 and flow into the compressor 210 via the suction port 211. The controller (e.g., 280 or the like) can be configured to adjust the opening of the flow control device 310 based on the parameters (e.g., discharge temperature, discharge superheat, or the like) sensed or measured by the sensor 290 to maintain the parameters at or below the desired or predetermined threshold.

It will be appreciated that FIG. 2 provides a liquid injection (liquid refrigerant directly from the receiver 230 injected to the compressor 210), without a vapor injection, to the suction port 211 through control of the flow control device 310. The embodiment can work also for non-built-in volume ratio compressors, including reciprocating compressors. The embodiment can minimize the discharge temperature, but may reduce capacity of the compressor.

In FIG. 3, the outlet 232 of the receiver 230 is fluidly connected to a liquid injection port 213 of the compressor 210 via a pipe or the like. The flow control device 310 is disposed downstream of the receiver 230 and upstream of the compressor 210. The refrigerant (e.g., liquid refrigerant) directly from the receiver 230 can flow into the compressor 210 via the liquid injection port 213. The controller (e.g., 280 or the like) can be configured to adjust the opening of the flow control device 310 based on the parameters (e.g., discharge temperature, discharge superheat, or the like) sensed or measured by the sensor 290 to maintain the parameters at or below the desired or predetermined threshold.

It will be appreciated that FIG. 3 provides a liquid injection (liquid refrigerant directly from the receiver 230 injected to the compressor 210), without a vapor injection, to an intermediate port (e.g., the liquid injection port 213) of the compressor through control of the flow control device 310. The embodiment can work for built-in volume ratio compressors or two stage compressors. The embodiment can minimize discharge temperature, and does not significantly reduce capacity of the compressor (compared with the embodiment of FIG. 2). The embodiment can work for a compressor without vapor injection.

Figure 4:
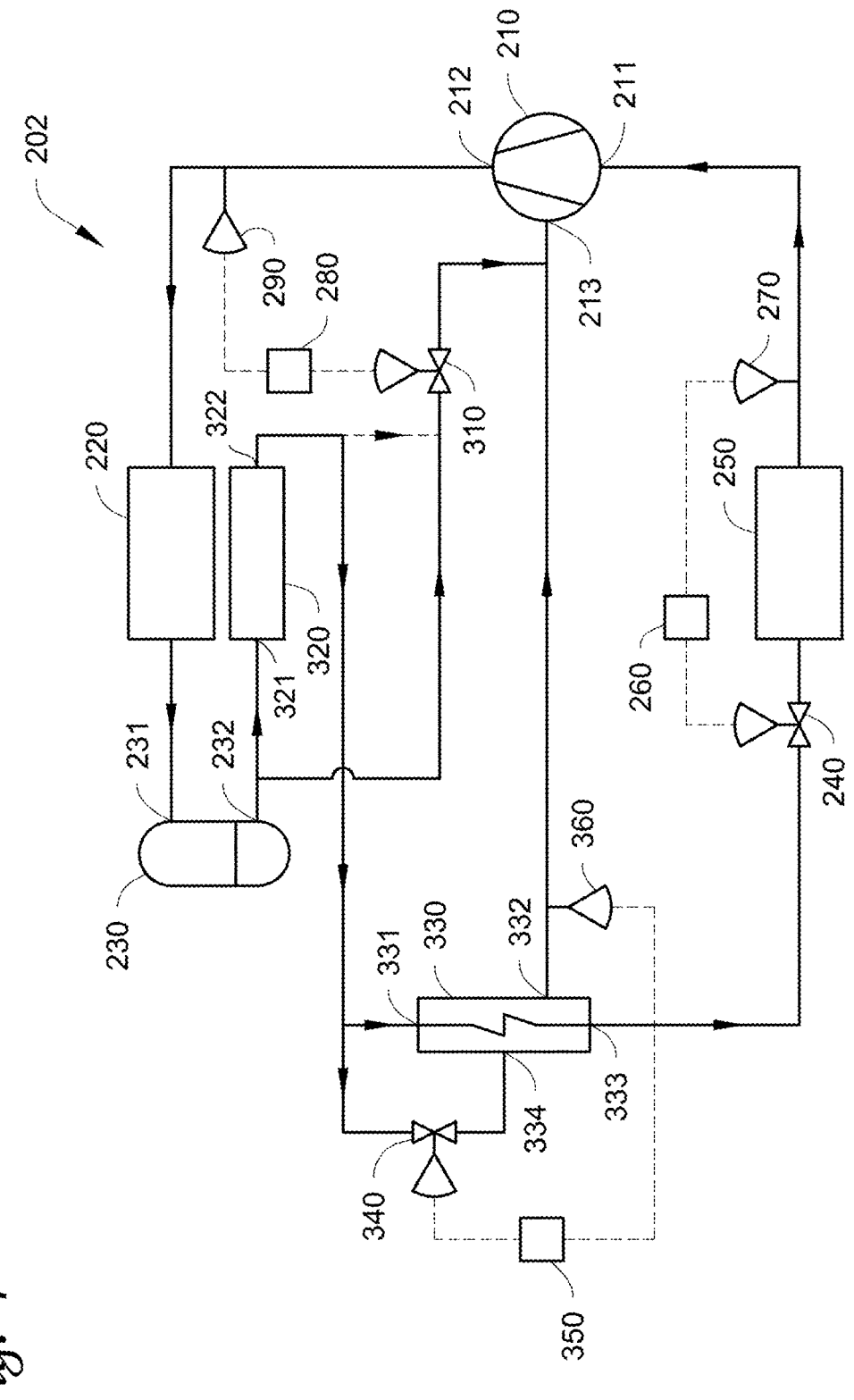

In FIG. 4, the refrigeration circuit 202 is similar to the refrigeration circuit 201 of FIG. 3, except the following. As shown in FIG. 4, the condenser includes a condensing unit 220 and a sub-cooling unit (or sub-cooler) 320 having an inlet 321 and an outlet 322. The receiver 230 is disposed downstream of the condensing unit 220 and upstream of the sub-cooling unit 320. In an embodiment, instead of the outlet 232 of the receiver 230 being fluidly connected to the intermediate port (e.g., the liquid injection port 213) and an amount or a flow rate of the liquid refrigerant directly from the receiver 230 being controlled by the opening of the flow control device 310, the outlet 322 of the sub-cooling unit 320 is fluidly connected to the intermediate port (e.g., the liquid injection port 213) and an amount or a flow rate of the liquid refrigerant directly from the sub-cooling unit 320 is controlled by the opening of the flow control device 310. The controller (e.g., 280 or the like) can be configured to adjust the opening of the flow control device 310 based on the parameters (e.g., discharge temperature, discharge superheat, or the like) sensed or measured by the sensor 290 to maintain the parameters at or below the desired or predetermined threshold.

In FIG. 4, the refrigeration circuit 202 includes an economizer 330 disposed downstream of the sub-cooling unit 320 and upstream of the expansion device 240. The economizer 330 includes an inlet 331, a vapor outlet 332, and a liquid outlet 333. It will be appreciated that the economizer 330 can be a type of sub-cooler that uses part of the total refrigerant flow from the condenser (220, 320) to cool the rest of the refrigerant flow. The evaporated refrigerant from the vapor outlet 332 can enter the intermediate port 213 of compressor 210 at an intermediate pressure level. The cold vapor from the vapor outlet 332 can also be used to provide extra cooling for the compressor 210. The vapor injection (vapor refrigerant from the economizer 330 injected to the compressor 210) and the liquid injection (liquid refrigerant directly from the receiver 230 or the sub-cooler 320 injected to the compressor 210) can be mixed and share a same intermediate port 213.

As shown in FIG. 4, the refrigeration circuit 202 can include a controller 350, an economizer expansion device 340 connected to another inlet 334 of the economizer 330, and a sensor 360. The economizer expansion device 340 can be an expansion valve, orifice, expander, or the like. It will be appreciated that controller(s) (260, 280, or 350) can be a single controller (e.g., the controller of the transport refrigeration unit/system of FIGS. 1A and 1C, the controller of the APU of FIG. 1B, or the like). The sensor 360 can be a temperature sensor, a pressure sensor, or the like, disposed downstream of the vapor outlet 332. The refrigerant entering the inlet 334 can be evaporated and flow out of the economizer 330 via the vapor outlet 332.

In another embodiment, the flow control device 310 and its corresponding connections can be removed from the refrigeration circuit 202, and having the economizer expansion device 340 to be configured to work in two modes: (1) controlled by the controller to control the superheat with the sensor 360, and (2) controlled by the controller to control discharge temperature with a temperature sensor. This mode may also be referred to as liquid over-feed mode (e.g., a mode of delivering a greater rate of liquid refrigerant to the economizer 330 than the rate that actually evaporates).

It will be appreciated that FIG. 4 provides a liquid injection (liquid refrigerant directly from the receiver 230 or the sub-cooler 320 injected to the compressor 210) mixed with a vapor injection (vapor refrigerant from economizer 330 injected to the compressor 210), or a vapor injection in a liquid over-feed mode, to a same intermediate port 213 of the compressor. The embodiment can be used for refrigerants (e.g., R404A, R452A, or the like) where the port area, based on suction dew temperature and discharge dew temperature, for liquid injection is relatively small and does not represent typical AHRI (American Heating and Refrigeration Institute) and ATP (Agreement on the International Carriage of Perishable Foodstuffs and on the Special Equipment to be Used for such Carriage) deep frozen conditions. The embodiment can minimize discharge temperature, but may reduce vapor injection mass flow, and therefore reducing sub-cooling capability of the main evaporator flow (i.e., less refrigeration capacity of the evaporator).

Figure 5:
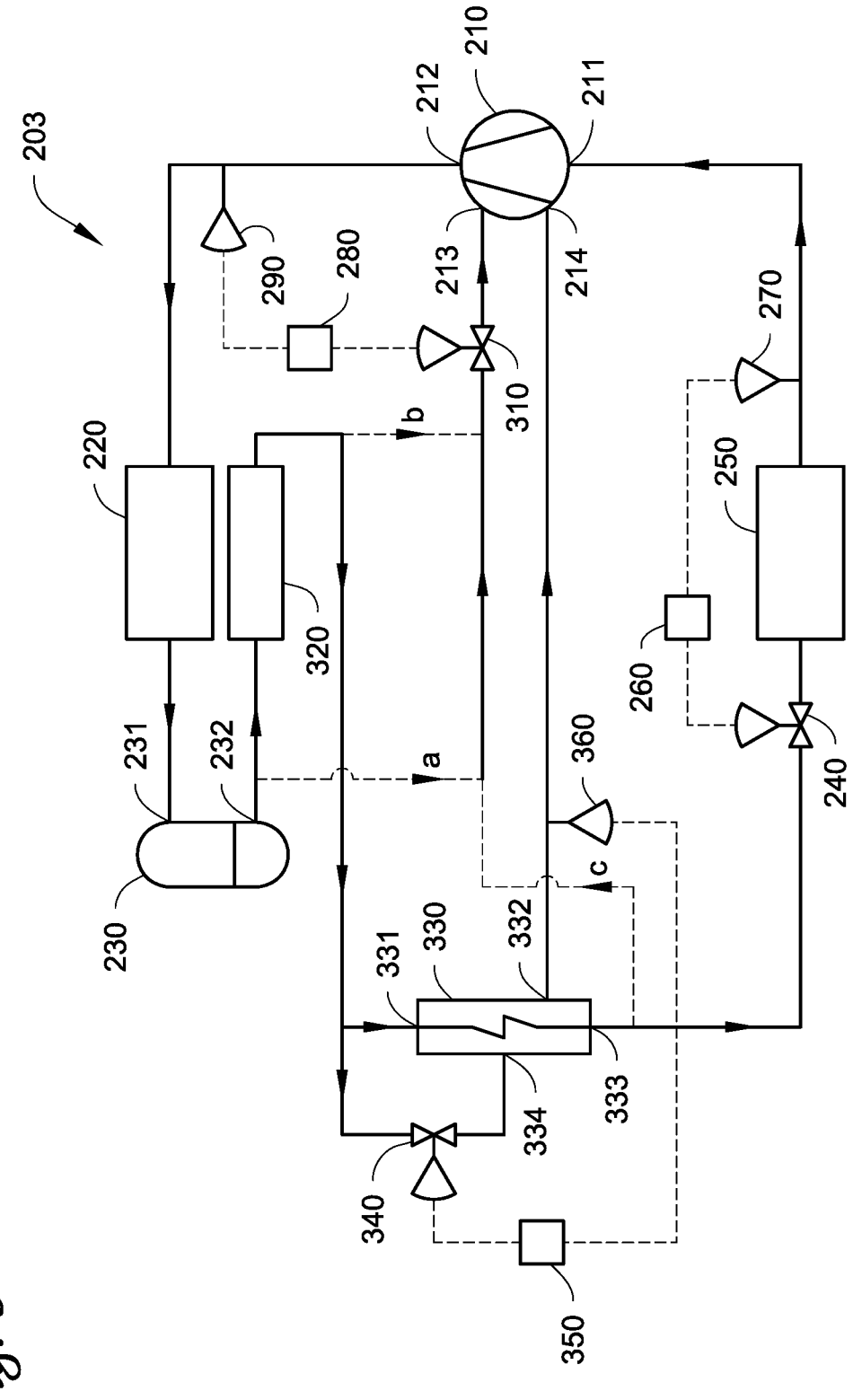

In FIG. 5, the refrigeration circuit 203 is similar to the refrigeration circuit 202 of FIG. 4, except the following. As shown in FIG. 5, the compressor 210 includes a liquid injection port 213 and a vapor injection port 214 separated from the liquid injection port 213. It will be appreciated that the liquid injection port 213 is closer to the discharge port 212 (e.g., higher in the compression chamber, or later in the compression process) than the vapor injection port 214. It will also be appreciated that the liquid injection port 213 may be as high as possible in the compression chamber (e.g., just below the discharge port), to prevent too much pressure drop. Also, in addition to liquid refrigerant directly from the receiver 230 (arrow "a") or liquid refrigerant (e.g., sub-cooled liquid) directly from the sub-cooler 320 (arrow "b"), liquid refrigerant can be directly from the liquid outlet 333 of the economizer 330 (arrow "c"). The controller (e.g., 280, 350, or the like) can be configured to simultaneously control the liquid injection by e.g., adjusting the opening of the flow control device 310, and the vapor injection by e.g., adjusting the opening of the economizer expansion device 340, based on the parameters (e.g., discharge temperature, discharge superheat, or the like) sensed or measured by the sensor 290 and/or sensor 360, to maintain the parameters at or below the desired or predetermined threshold.

Figure 6:
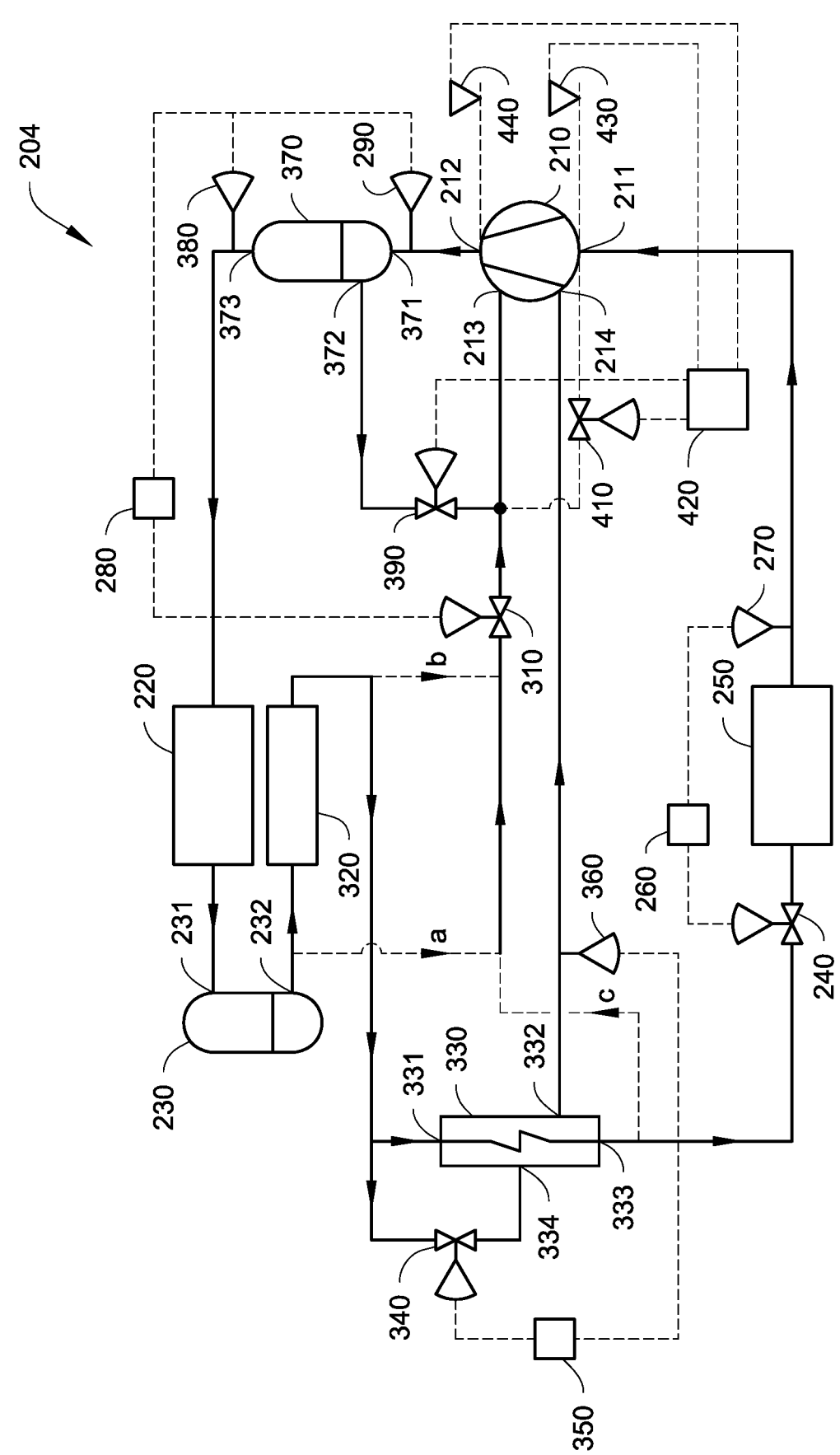

In FIG. 6, the refrigeration circuit 204 is similar to the refrigeration circuit 203 of FIG. 5, except the following. As shown in FIG. 6, the refrigeration circuit 204 includes an oil separator 370 disposed downstream of the compressor 210 and upstream of the condensing unit 220. The oil separator 370 can be configured to separate the liquid oil (e.g., lubricant, refrigerant, or the like) from the vapor (e.g., refrigerant, or the like). In an embodiment, the oil separator 370 may need a heater during start up. The oil separator 370 includes an inlet 371, a liquid outlet 372, and a vapor outlet 373. The liquid outlet 372 can connect to the liquid injection port 213. An opening of the flow control device 390 (e.g., a valve, an orifice, a tap, or the like) can be adjusted (e.g., by the controller) to control an amount or a flow rate of the liquid from the liquid outlet 372 to the liquid injection port 213. In such embodiment, the liquid injection port 213 can also be used as an oil return port to receive oil from the oil separator 370.

The refrigeration circuit 204 can also include a sensor 380 disposed downstream of the oil separator 370 and upstream of the condensing unit 220. In an embodiment, the sensor 380 can be an alternative sensor to the sensor 290. The refrigeration circuit 204 can also include a sensor 440 configured to sense or measure an oil level of a discharge sump (not shown) of the compressor 210. The refrigeration circuit 204 can further include a sensor 430 configured to sense or measure an oil level of a suction sump (not shown) of the compressor 210.

The embodiment can work for scroll compressors with discharge and suction sumps. In an embodiment, the sump of the compressor can be on either the suction side or the discharge side. In the application where the compressor 210 has a suction sump, an additional connection (from the flow control device 390 to the suction sump, through a control of a flow control device 410 (e.g., a valve, an orifice, a tap, or the like) by a controller 420) may be used for oil supply from the oil separator 370 to the suction sump, to maintain an oil level in the suction sump at or above a desired or predetermined level. It will be appreciated that controller(s) (260, 280, 350, or 420) can be a single controller (e.g., the controller of the transport refrigeration unit/system of FIGS. 1A and 1C, the controller of the APU of FIG. 1B, or the like).

The embodiments of FIGS. 5 and 6 provide a simultaneous control of vapor injection and liquid injection. The embodiments can be used for A2L refrigerants (e.g., R454A, R454C, or the like) because such refrigerants typically run with a higher discharge temperature due to higher heat of compression compared to refrigerants such as R404A, R452A, or the like. It will be appreciated that the port area (see FIG. 7), based on the suction dew temperature and the discharge dew temperature, where liquid injection is needed, may be significantly larger for the A2L refrigerants compared to refrigerants such as R404A, R452A, or the like.

Embodiments disclosed herein can help to maintain a discharge temperature below a desired threshold level. Embodiments disclosed herein can also prevent reduced vapor injection mass flow and thus prevent reduction of sub-cooling capability of the refrigerant flowing through the evaporator which can result in reduced refrigeration capacity of the evaporator. Embodiments disclosed herein can further help to achieve as wide a compressor operating envelope as possible within the mechanical design limits or applicable standards.

In an embodiment, the compressor 210 can have an overall built-in volume ratio, which can be the volume of the groove(s) (or flute(s), e.g., scroll flute(s), scroll valley(s), or the like) when closing to suction, divided by the volume of the groove(s) when the groove(s) are opening to discharge, in the range of 2.3 to 3.5. It will be appreciated that the overall built-in volume ratio can be the geometric ratio of suction volume at the closure of the suction pocket divided by the volume of the final compression pocket at the initiation of the discharge process. In such embodiment, a volume ratio of the vapor injection port 214, which can be the built-in volume ratio of the groove(s), when the vapor injection port is in the middle of the groove(s), can be in the range of 1.05 to 1.5 or 1.1 to 1.5. In such embodiments, a volume ratio of the liquid injection port 213, which can be the built-in volume ratio of the groove(s) when the liquid injection port is in the middle of the groove(s), can be in the range of 1.4 to 1.6 or 1.25 to 1.75. In an embodiment, the compressor's overall average built-in volume ratio can be 2.4, the average built-in volume ratio for the vapor injection port can be 1.1, and the average built-in volume ratio for a liquid injection port separated from the vapor injection port can be 1.5.

In an embodiment, it is desirable that the vapor injection port 214 is never communicating with a groove (e.g., a flute, a scroll flute, a scroll valley, or the like) that is communicating with the suction port 211. In an embodiment, it is desirable that the liquid injection port 213 is never communicating with a groove that is communicating with a groove that is communicating with the vapor injection port 214. In an embodiment, it is desirable that the liquid injection port 213 is never communicating with a groove that is communicating with the discharge port 212.

Figure 7:
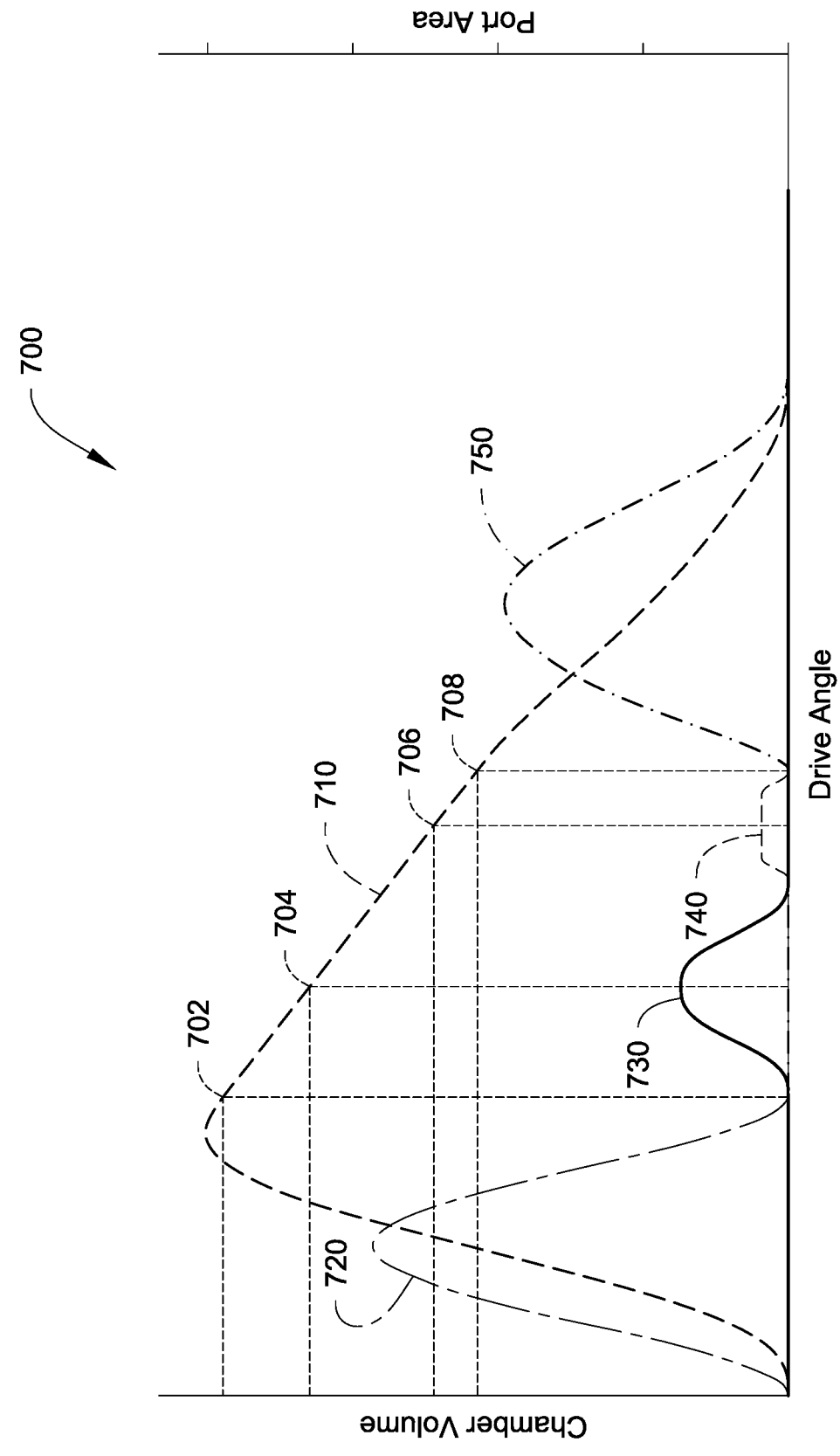
FIG. 7 illustrates volume curves of the compressor of FIGS. 5 and 6, according to an embodiment.

FIG. 7 illustrates volume curves 700 of the compressor 210 of FIGS. 5 and 6, according to an embodiment. The vertical coordinate can be the chamber volume (e.g., in the unit of cubic meter) of the compressor 210. The horizontal coordinate can be the drive angle of the compressor 210. It will be appreciated that the phrase "driveshaft" may refer to a component for transmitting mechanical power and torque and rotation. The phrase "drive angle" may refer to an operating angle of the driveshaft of the compressor 210.

In FIG. 7, the area covered by the volume curve 710 is the compression chamber volume. On the volume curve 710, 702 indicates volume at suction close, 704 indicates volume at middle of vapor injection, 706 indicates volume at middle of liquid injection, and 708 indicates volume at beginning of discharge. The area covered by the volume curve 720 is the suction port area or volume. The area covered by the volume curve 730 is the vapor injection port area or volume. The area covered by the volume curve 740 is the liquid injection port area or volume. The area covered by the volume curve 750 is the discharge port area or volume. It will be appreciated that the height of the liquid injection port and the height of the vapor injection port are configured so that the areas (720, 730, 740 and 750) have no or least overlap, to maximize compression efficiency, and/or to reduce internal compression leakage.

Figure 8:
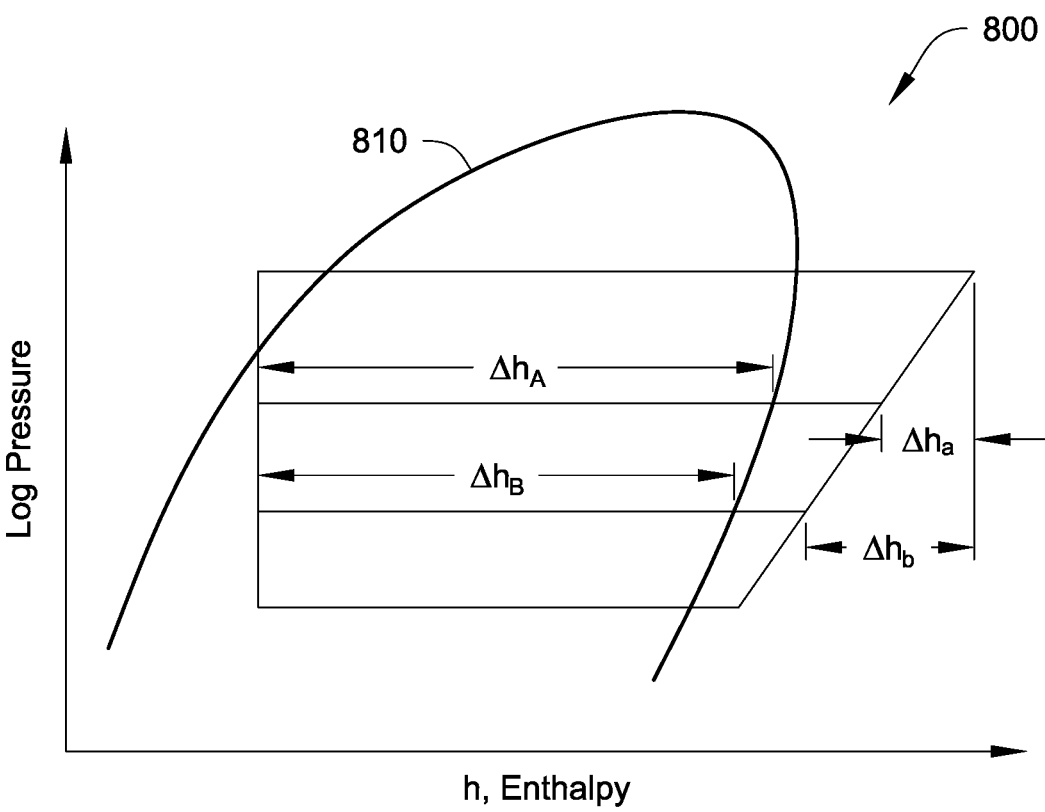
FIG. 8 illustrates a pressure-enthalpy diagram (log P/h diagram) of a compressor having a liquid injection port, according to an embodiment.

FIG. 8 illustrates a pressure-enthalpy diagram (e.g., a log P/h diagram) 800 of a compressor having a liquid injection port, according to an embodiment. The vertical coordinate can be the logarithmical pressure (e.g., in the unit of pascal). The horizontal coordinate can be the enthalpy (e.g., in the unit of kcal/kg). The log P/h diagram curve 810 shows that Aha is less than Ahb (assuming AhA is equal to AhB), and thus it can be more advantageous to inject liquid later in the compression process.

Figure 9:
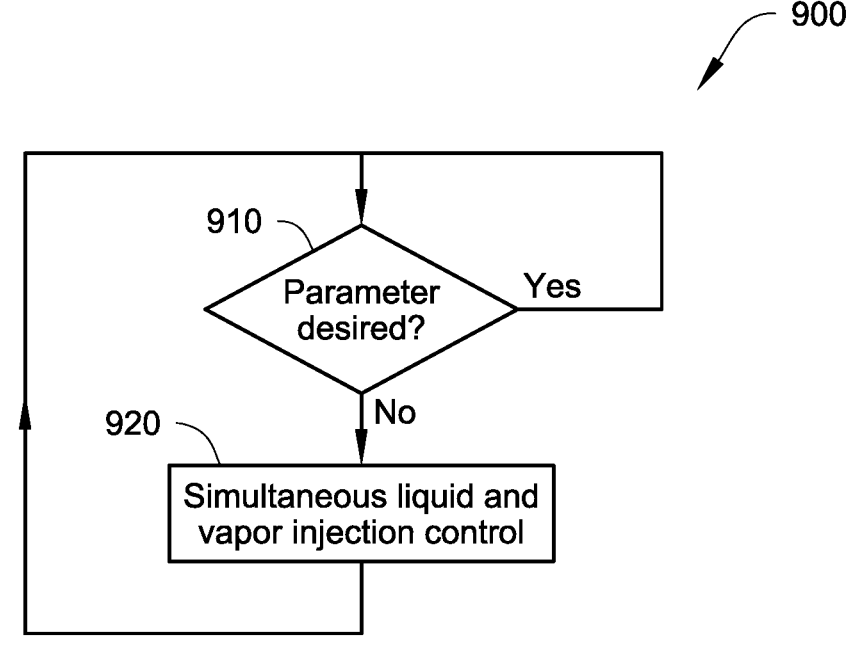
FIG. 9 is a flow chart illustrating a method for simultaneous vapor and liquid injection control for a transport climate control system, according to an embodiment.

FIG. 9 is a flow chart illustrating a method 900 for simultaneous vapor and liquid injection control for a transport climate control system (e.g., the MTRS 100, the TRU 110 and 14, the HVAC system shown in FIGS. 1A-1C, etc.) to, for example, maintain a desired discharge temperature, according to an embodiment. The method 900 can be used in conjunction with any of the refrigeration circuits 200-204 shown in FIGS. 2-6.

It will be appreciated that the method 900 disclosed herein can be conducted by a controller (e.g., the controller of the transport refrigeration unit/system of FIGS. 1A and 1C, the controller of the APU of FIG. 1B, or any suitable processor(s)), unless otherwise specified. The controller can include a processor, memory, and/or communication ports to communicate with e.g., other components of the TCCS or with equipment or systems located in proximity to the TCCS or a cargo load. The controller can communicate with other components using e.g., powerline communications, Pulse Width Modulation (PWM) communications, Local Interconnect Network (LIN) communications, Controller Area Network (CAN) communications, etc., and using any suitable communications including wired and/or wireless, analog and/or digital communications. In an embodiment, the communication can include communications over telematics of the TCCS, which the TCCS may include or which may be communicatively connected to the TCCS (e.g., telematics equipment, mobile phone, vehicle communication system, etc.). The TCCS can include sensors (e.g., temperature, pressure, humidity, motion, voltage, current, battery status, battery charging level, or the like) or the TCCS can communicate with sensors associated or embedded with a cargo. The controller can obtain data sensed by the sensors and control the settings of the components (e.g., the flow control devices or the like) of the TCCS.

It will also be appreciated that the method 900 can include one or more operations, actions, or functions depicted by one or more blocks. Although illustrated as discrete blocks, various blocks may be divided into additional blocks, combined into fewer blocks, or eliminated, depending on the desired implementation. The method 900 begins at 910.

At 910, the controller is configured to determine a parameter (e.g., a heat of compression, a Cp/Cv ratio or a heat capacity ratio, a discharge temperature, and/or a discharge superheat). The parameter can be either directly sensed or measured by sensor(s) or determined by the controller using the sensed or measured data. If the parameter is at or below a desired or predetermined threshold, the methods 900 loops back to 910. If the parameter is above the desired or predetermined threshold, the methods 900 proceeds to 920.

At 920, the controller is configured to simultaneously control the vapor injection and the liquid injection (see FIGS. 5 and 6). The simultaneous control includes the control of one or more of the flow control devices (310, 340, 390, or the like) to adjust an amount or a flow rate of the vapor and/or liquid injecting into the compressor, to reduce or maintain the parameter (see step 910) at or below the desired or predetermined threshold. In an embodiment, the simultaneously control can include the control of one or more of the flow control devices (390, 410, or the like) to maintain an oil level in the suction sump at or above a desired or predetermined level. In such embodiment, 910 may include a step of the controller determining an oil level of the suction sump. If the oil level of the suction sump is at or above the desired or predetermined level, no actions may be taken (i.e., looping back to 910 itself). If the oil level of the suction sump is below the desired or predetermined level, the method proceeds from 910 to 920, and at 920 the controller can control the one or more of the flow control devices (390, 410, or the like) to adjust an amount or a flow rate of return oil to maintain the oil level in the suction sump at or above a desired or predetermined level. The methods 900 then proceeds from 920 back to 910.

Accordingly, the method 900 can maintain the discharge temperature below a desired threshold level. Accordingly, the method 900 can prevent reduced vapor injection mass flow and thus prevent reduction of sub-cooling capability of the refrigerant flowing through the evaporator which can result in reduced refrigeration capacity of the evaporator. Embodiments disclosed herein can also help to achieve as wide a compressor operating envelope as possible within the mechanical design limits or applicable standards.

ASPECTS

It is appreciated that any one of aspects 1-10 and 11-20 can be combined.

Aspect 1. A transport climate control system with simultaneous vapor and liquid injection, comprising:
a compressor, a condenser having a condensing unit and a sub-cooling unit, a receiver, an economizer having a vapor outlet and a liquid outlet, a controller, and a flow control device,
wherein the receiver is disposed downstream of the condensing unit and upstream of the sub-cooling unit, the economizer is disposed downstream of the sub-cooling unit,
the compressor includes a suction port, a vapor injection port connected to the vapor outlet of the economizer, and a liquid injection port separated from the vapor injection port,
the controller is configured to control the flow control device to adjust an amount of liquid refrigerant into the liquid injection port to maintain a discharge temperature of the compressor at or below a threshold.

Aspect 2. The system according to aspect 1, wherein the liquid injection port is not communicating with a flute of the compressor that is communicating with a flute of the compressor that is communicating with the vapor injection port.

Aspect 3. The system according to aspect 1 or aspect 2, wherein the liquid injection port is not communicating with a flute of the compressor that is communicating with a discharge port of the compressor.

Aspect 4. The system according to any one of aspects 1-3, wherein the vapor injection port is not communicating with a flute of the compressor that is communicating with the suction port.

Aspect 5. The system according to any one of aspects 1-4, wherein the liquid injection port is connected to an outlet of the sub-cooling unit, the flow control device is disposed downstream of the outlet of the sub-cooling unit and upstream of the compressor.

Aspect 6. The system according to any one of aspects 1-4, wherein the liquid injection port is connected to an outlet of the receiver, the flow control device is disposed downstream of the outlet of the receiver and upstream of the compressor.

Aspect 7. The system according to any one of aspects 1-4, wherein the liquid injection port is connected to the liquid outlet of the economizer, the flow control device is disposed downstream of the liquid outlet of the economizer and upstream of the compressor.

Aspect 8. The system according to any one of aspects 1-7, further comprising an oil separator disposed downstream of the compressor and upstream of the condensing unit.

Aspect 9. The system according to aspect 8, wherein the oil separator includes a liquid outlet and a vapor outlet, the liquid outlet of the oil separator is connected to the liquid injection port.

Aspect 10. The system according to aspect 8, wherein the oil separator includes a liquid outlet and a vapor outlet, the liquid outlet of the oil separator is connected to a suction sump of the compressor.

Aspect 11. A method for simultaneous vapor and liquid injection control for a transport climate control system, the system including a compressor, a condenser having a condensing unit and a sub-cooling unit, a receiver, an economizer having a vapor outlet and a liquid outlet, a controller, and a flow control device, wherein the receiver is disposed downstream of the condensing unit and upstream of the sub-cooling unit, the economizer is disposed downstream of the sub-cooling unit; the compressor includes a suction port, a vapor injection port connected to the vapor outlet of the economizer, and a liquid injection port separated from the vapor injection port, the method comprising:
controlling the flow control device to adjust an amount of liquid refrigerant into the liquid injection port; and
maintaining a discharge temperature of the compressor at or below a threshold.

Aspect 12. The method according to aspect 11, wherein the liquid injection port is not communicating with a flute of the compressor that is communicating with a flute of the compressor that is communicating with the vapor injection port.

Aspect 13. The method according to aspect 11 or aspect 12, wherein the liquid injection port is not communicating with a flute of the compressor that is communicating with a discharge port of the compressor.

Aspect 14. The method according to any one of aspects 11-13, wherein the vapor injection port is not communicating with a flute of the compressor that is communicating with the suction port.

Aspect 15. The method according to any one of aspects 11-14, wherein the liquid injection port is connected to an outlet of the sub-cooling unit, the flow control device is disposed downstream of the outlet of the sub-cooling unit and upstream of the compressor.

Aspect 16. The method according to any one of aspects 11-14, wherein the liquid injection port is connected to an outlet of the receiver, the flow control device is disposed downstream of the outlet of the receiver and upstream of the compressor.

Aspect 17. The method according to any one of aspects 11-14, wherein the liquid injection port is connected to the liquid outlet of the economizer, the flow control device is disposed downstream of the liquid outlet of the economizer and upstream of the compressor.

Aspect 18. The method according to any one of aspects 11-17, wherein the transport climate control system further includes an oil separator disposed downstream of the compressor and upstream of the condensing unit.

Aspect 19. The method according to aspect 18, wherein the oil separator includes a liquid outlet and a vapor outlet, the liquid outlet of the oil separator is connected to the liquid injection port.

Aspect 20. The method according to aspect 18, wherein the oil separator includes a liquid outlet and a vapor outlet, the liquid outlet of the oil separator is connected to a suction sump of the compressor.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A transport climate control system with simultaneous vapor and liquid injection, comprising:
   a compressor, a condenser, a sub-cooler, a receiver, an economizer having a vapor outlet and a liquid outlet, a controller, and a flow control device,
   wherein the receiver is disposed downstream of the condenser and upstream of the sub-cooler, the economizer is disposed downstream of the sub-cooler,
   the compressor includes a suction port, a vapor injection port connected to the vapor outlet of the economizer, and a liquid injection port separated from the vapor injection port,
   the controller is configured to control the flow control device to adjust an amount of liquid refrigerant into the liquid injection port to maintain a discharge temperature of the compressor at or below a threshold,
   the liquid injection port is connected to the liquid outlet of the economizer and is connected to an outlet of the sub-cooler at a location upstream of the economizer, and
   the flow control device is disposed directly downstream of the liquid outlet of the economizer, directly downstream of the outlet of the sub-cooler, and directly upstream of the compressor.

2. The system according to claim 1, wherein the liquid injection port is disposed closer to a discharge port of the compressor than the vapor injection port.

3. The system according to claim 1, wherein the vapor injection port is separated from the suction port.

4. The system according to claim 1, wherein the liquid injection port is connected to an outlet of the receiver at a location upstream of the sub-cooler, the flow control device is disposed downstream of the outlet of the receiver and upstream of the compressor.

5. The system according to claim 1, further comprising an oil separator disposed downstream of the compressor and upstream of the condenser.

6. The system according to claim 5, wherein the oil separator includes a liquid outlet and a vapor outlet, the liquid outlet of the oil separator is connected to the liquid injection port at a location downstream of the flow control device.

7. The system according to claim 5, wherein the oil separator includes a liquid outlet and a vapor outlet, the liquid outlet of the oil separator is connected to the compressor at a location separate from the liquid injection port and the vapor injection port.

8. A transport climate control system with simultaneous vapor and liquid injection, comprising:
   a compressor, a condenser, a sub-cooler, a receiver, an economizer having a vapor outlet and a liquid outlet, a controller, and a flow control device,
   wherein the receiver is disposed downstream of the condenser and upstream of the sub-cooler, the economizer is disposed downstream of the sub-cooler,
   the compressor includes a suction port, a vapor injection port connected to the vapor outlet of the economizer, and a liquid injection port separated from the vapor injection port,
   the controller is configured to control the flow control device to adjust an amount of liquid refrigerant into the liquid injection port to maintain a discharge temperature of the compressor at or below a threshold,
   the liquid injection port is connected to the liquid outlet of the economizer and is connected to an outlet of the receiver at a location upstream of the sub-cooler, and
   the flow control device is disposed directly downstream of the liquid outlet of the economizer, directly downstream of the outlet of the receiver, and directly upstream of the compressor.

9. A transport climate control system with simultaneous vapor and liquid injection, comprising:
   a compressor, a condenser, a sub-cooler, a receiver, an economizer having a vapor outlet and a liquid outlet, a controller, and a flow control device,
   wherein the receiver is disposed downstream of the condenser and upstream of the sub-cooler, the economizer is disposed downstream of the sub-cooler,
   the compressor includes a suction port, a vapor injection port connected to the vapor outlet of the economizer, and a liquid injection port separated from the vapor injection port,
   the controller is configured to control the flow control device to adjust an amount of liquid refrigerant into the liquid injection port to maintain a discharge temperature of the compressor at or below a threshold,
   the liquid injection port is connected to the liquid outlet of the economizer, is connected to an outlet of the sub-cooler at a location upstream of the economizer, and is connected to an outlet of the receiver at a location upstream of the sub-cooler, and
   the flow control device is disposed directly downstream of the liquid outlet of the economizer, directly downstream of the outlet of the sub-cooler, directly downstream of the outlet of the receiver, and directly upstream of the compressor.

* * * * *